Aug. 29, 1967 V. J. WEBERS 3,338,164

LITHOGRAPHIC MASTER ELEMENTS FOR
RECEPTION OF HYDROPHOBIC IMAGES

Filed May 20, 1965

INVENTOR
VINCENT JOSEPH WEBERS

BY William B. Cridlin, Jr.

ATTORNEY

United States Patent Office 3,338,164

Patented Aug. 29, 1967

3,338,164

LITHOGRAPHIC MASTER ELEMENTS FOR RECEPTION OF HYDROPHOBIC IMAGES

Vincent Joseph Webers, Red Bank, N.J., assignor to E. I. du Pont de Nemours and Company, Wilmington, Del., a corporation of Delaware Filed May 20, 1965, Ser. No. 457,351
8 Claims. (Cl. 101—457)

This invention relates to improved lithographic surfaces and processes for making such surfaces. Still more particularly it relates to lithographic surfaces that may be imaged by photopolymerization techniques.

In the art of producing multiple copies or prints from an original, many present commercial systems have been devised that use offset lithography. In these systems, a hydrophilic (nonprinting) layer on a water-resistant support is imaged by various means that apply, imagewise, hydrophobic material to the surface of the layer. The hydrophobic material receives the ink from an ink source and transfers the ink in image form to the receptor or copy sheet, either directly or via an offset printing cylinder. The hydrophilic layer on the support in many instances is composed of an inert filler in an appropriate binder; and many such hydrophilic layers are known in the art. U.S. patent, Beatty, 2,760,431 describes such a layer composed of zinc oxide, zinc acetate, and a clay filler in a polyacrylic acid binder.

The hydrophilic layers known in the art are imaged by applying an ink receptive, water repellent, hydrophobic material to its surface, such as by typing with a hydrophobic ink ribbon, by writing or drawing with a hydrophobic pencil, or by coating the hydrophilic layer with a conventional photosensitive composition and exposing and developing the composition. As an example of the latter method of imaging, diazo compositions have been coated on hydrophilic layers to produce presensitized photolithographic plates.

Various processes for producing copies of an image embodying photopolymerization and thermal transfer or room temperature transfer techniques are known. In assignee's U.S. patent, Burg and Cohen, 3,060,023 dry processes are described for forming images by photopolymerization and thermal transfer, and in assignee's pending application, Colgrove (Ser. No. 375,629, filed June 16, 1964) a method of forming images involving photopolymerization and development by room temperature delamination is described. In the Burg and Cohen process a photopolymerizable layer coated on a suitable support is exposed imagewise to an original having line and/or halftone dot images. The surface of the exposed layer is then pressed into contact with the image-receptive surface of a separate element and at least one of said elements is heated to a temperature above the transfer temperature of the underexposed portions of the layer. The two elements are then separated whereby the thermally transferable underexposed image areas of the layer transfer to the image-receptive element. Related processes involving the transfer of pigments and dyes with the underexposed portions of the layer are disclosed in assignee's U.S. patents, Burg and Cohen, 3,060,024 and 3,060,025.

In the Colgrove process, a photopolymerizable layer coated on a support is laminated to a second support and exposed imagewise to actinic radiation. The two supports have different adhesive forces for the photopolymerizable layer, depending whether it is polymerized or unpolymerized, i.e., in the polymerized state the layer has greater adhesion for one support than the second, while in the unpolymerized state there is greater adhesion to the second support. After the exposure, the supports are stripped apart at room temperature with the unpolymerized areas of the photopolymerizable layer adhering to the second support and forming a positive image, and the polymerized areas adhering to the first support and forming a negative image.

Using either of these techniques to produce the hydrophobic image on the hydrophilic surfaces presently known in the lithographic art has created problems, one of which is obtaining sufficient adhesion between the hydrophilic surface and the polymeric material which forms the printing image. With poor adhesion, the quality of the polymer image is poor and the image wears away quickly, resulting in short press life. Another problem is that some photopolymerizable layers have a wax overcoat such as described in assignee's pending patent application, Burg, Ser. No. 234,214, fiiled Oct. 30, 1962, and during the image transfer because of the transfer of the wax, it is difficult to maintain the nonprinting background areas hydrophilic. Additionally, the transfer of the wax to the receptor reduces the adhesion of the polymeric material to the receptor and affects the wearing ability of the polymer image.

Therefore, it is an object of this invention to provide a new and improved lithographic surface. Another object is to provide a lithographic surface that is easy to make and has long image life. Another object is to provide a lithographic surface that has an image easily produced by photopolymerization and thermal or room temperature transfer techniques. A further object is to provide a lithographic surface that reproduces high quality prints and can be adapted with minimum change to the prior art copying or printing machines. A still further object is to provide simple processes for making such lithographic surfaces. Still further objects will be apparent from the following description of the invention.

The above objects are accomplished in accordance with the present invention which in its broader aspects comprises:

A lithographic printing master element comprising:

(a) A water resistant support, and (b) A water insoluble coating composition on said support comprising a hydrophilic filler, an dthe salt produced by the reaction of a polyethylenimine with a polybasic acid selected from the group consisting of polyacrylic acid, polymethacrylic acid, polychloroacrylic acid, copolymers of said polymeric acids, a copolymer of acrylic acid, a copolymer of itaconic acid and a copolymer of maleic acid in which the equivalent weight of said polymeric acids and copolymers is no greater than 150, the ratio of equivalents of said polyethylenimine to the ratio of equivalents of said polybasic acid being at least 1.3 to 1.

If a lithographic printing element is desired, hydrophobic material can be applied in image form to the surface of said coating composition by various known procedures.

In order to easily coat the above composition it is desirable to dissolve the polyethylenimine and the polybasic acid in aqueous ammonia prior to combining them and coating; additional solvents may also be used in conjunction with the ammonia. The ammonia inhibits the reaction by creating the ammonium salt of the polyacid to give a polyanion which does not react with polyethylenimine. After the ammonia in the coated layer has evaporated, the reaction to produce the desired salt takes place.

While the printing element just described is not limited to any specific method of manufacture, applicant has devised a simple process for making the element using photopolymerizable materials to form the hydrophobic image.

The present invention also comprises:

The process of manufacturing a lithographic printing element comprising coating on an appropriate support a coating composition comprising a hydrophilic filler, and a polybasic acid selected from the group consisting of polyacrylic acid, polymethacrylic acid, polychloroacrylic acid, copolymers of said polymeric acids, or copolymers of acrylic, itaconic, or maleic acid in which the equivalent weight is 150 or less, with a polyethylenimine in aqueous ammonia, drying the coating to evaporate the ammonia and create a salt produced by the reaction between the polyethylenimine and said polybasic acid, and imaging the surface of the coating by the imagewise transfer of the underexposed areas of an exposed imagebearing photopolymerizable layer to said surface.

In practicing the invention the transfer of the polymer image to the hydrophilic surface can be accomplished thermally or by room temperature transfer as described in the previously mentioned Colgrove application. In yet another aspect, the surface of the hydrophilic coating composition can be imaged by means other than the transfer of photopolymer images, i.e., mechanically applying hydrophobic image material by typing, writing, etc.

The attached drawing, which constitutes a part of the specification, is a schematic diagram of a preferred method of using the lithographic surface of the invention with a photopolymer image.

Figures 1, 2:
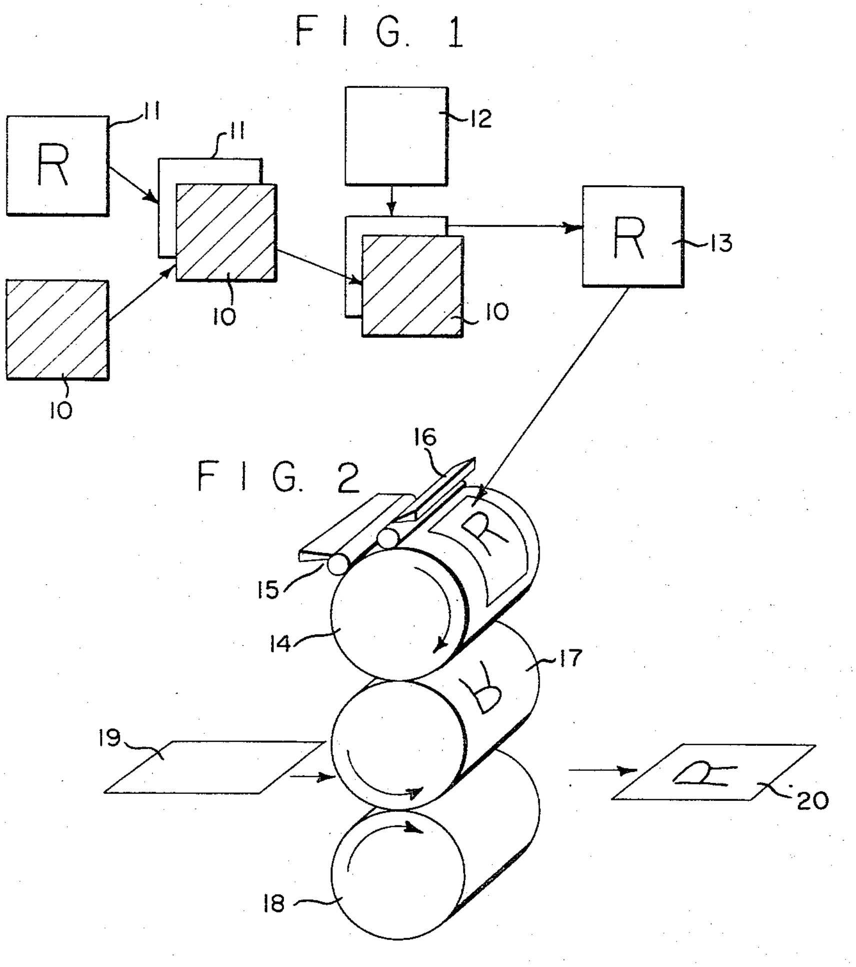
FIG. 1 represents a schematic view of the preparation of the imaged master.
FIG. 2 is a schematic of an offset press equipped with the imaged master.

Referring to FIG. 1, a photopolymer element 10 is imagewise exposed to the copy 11 which is to be reproduced. The exposed photopolymer element 10 is then brought into contact with a master sheet 12 and the image is transferred to the master by one of several methods (i.e., heat or cold pressing) to give the imaged master 13. The imaged master is then "etched" before being placed on a press.

In FIG. 2 the imaged master 13 has been placed on a master cylinder 14. The master cylinder has supply fountain and roller systems in contact with its surface. One fountain and roller 15 suppy a dampening solution to the image master attached to the master cylinder and the other fountain and roller 16 supply the ink necessary for the reproduction of the copies. As the master cylinder 14 rotates the inked image master 13 is pressed against an offset cylinder 17 which receives on its surface an ink print of the image master. The offset cylinder rotates in contact with a pressure cylinder and a receptor sheet 19 is passed between the two cylinders 17 and 18. The receptor sheet receives the ink print from the surface of offset cylinder 17 and a copy 20 of the original imaged master 13 is thereby obtained.

A suitable water-resistant sheet, e.g., hydrophobic, synthetic resin sized paper, is used as the support for the coating composition. The support can also be made from plastic films or sheets, thin metal sheets or foils, or papers or cloth derived from natural or synthetic textile fibers. The main requirement of the support is that it be flexible for mounting on various imaging and printing devices and that it has sufficient wet strength to maintain dimensional stability during the printing operation. Thus it may be necessary to treat some water absorbing papers or textile fibers with water repellent materials, e.g., resinous solutions, waxes, oils, or fatty acid amines, to improve the wet strength of the support.

A coating composition is prepared by making up solutions of polyacrylic acid and polyethylenimine in aqueous ammonia. Instead of polyacrylic acid, the ammonium salt of polyacrylic acid, i.e., ammonium polyacrylate, can be used. When the polyacrylic acid is in the ammonia solution, a polyanion is formed which does not react with the polyethylenimine. The solutions are then combined. To this solution is added a hydrophilic filler, e.g., clay or silica gel. The solution containing the filler is mixed in a suitable device, e.g., a ball mill, until the filler is suspended.

It has been found that the amount of polyacrylic acid and polyethylenimine needed not necessarily be stoichiometric, and when the equivalents ratio of polyethylenimine to polyacrylic acid is about 2.6 to 1, the best results are obtained.

The coating solution is then coated on the support to a thickness of about 0.002 inch by any of the suitable coating processes known in the art, e.g., air knife coating, skim coating, extrusion coating, roll coating, etc. The coating is dried at elevated temperatures to evaporate the water and ammonium hydroxide. When the ammonia has evaporated, the polyacrylic acid and polyethylenimine react to produce the salt, polyethylenimine polyacrylate. The dried coating is then a hydrophilic surface or is easily made so in the process of use, and is suitable for lithographic reproduction after it has been imaged.

During drying, as the ammonium hydroxide evaporates, the coating becomes water-insoluble and somewhat porous, i.e., the voids between the filler particles are not completely filled with the binder, e.g., the salt of polyacrylic acid with polyethylenimine. The porosity of the master and its receptivity to water is controlled by the particle size of the filler, uniformity of the filler particle size, and the filler to binder ratio.

Although it can be imaged by mechanical means such as typing or writing with hydrophobic materials, the preferred method of imaging involves the exposure of photopolymerizable material and the thermal or room temperature transfer of a polymer image to the hydrophilic surface of the coating.

In this preferred imaging process, the original image to be reproduced is brought into contact with a photopolymerizable matrix, the original against the photopolymerizable layer. The matrix is composed of a photopolymerizable composition coated on a suitable support, such as described in Burg et al., 3,060,023, and assignee's Burg and Cohen application, Ser. No. 163,078, filed Dec. 29, 1961, and Ser. No. 156,538, filed Dec. 1, 1961. The sandwich is then exposed to actinic light, either by transmission or reflectographic exposure. The exposure can be accomplished in several of the exposure devices known in the prior art, e.g., a vacuum frame with a carbon arc light, a fluorescent lamp, a mercury-vapor arc, or in photothermographic copying machines such as disclosed in assignee's pending applications, Heiart et al., Ser. No. 234,616, filed Nov. 1, 1962, or Cohen, Ser. No. 250,856, filed Jan. 11, 1963. The conditions of exposure are such that substantial addition polymerization takes place in the exposed areas to form an addition polymer and no significant polymerization takes place in the underexposed areas. The term "underexposed" as used herein is intended to cover the image areas which are completely unexposed or partially exposed so that there is a material amount of the addition polymerizable compound still present and insufficient addition polymer image has been formed to bind the constituents. In the underexposed image areas the softening temperature of the photopolymer remains substantially lower than that of the complementary exposed image areas.

The original is then removed and the photopolymerizable layer is brought into intimate contact with the hydrophilic surface previously described. The sandwich is heated and pressed by heated rollers, heated platens, etc. to a temperature and pressure sufficient to cause the underexposed areas of the photopolymerized layer to soften and adhere to the hydrophilic surface, i.e., at least 40° C. The photopolymerized matrix is then separated or stripped from the master, leaving the desired image on the master, i.e., the underexposed areas are transferred to the hydrophilic surface and the exposed areas remain on the photopolymer support. This image is a right-reading positive of the original.

Alternatively, the master or hydrophilic surface can be imaged by room temperature transfer. The master is laminated to an unexposed photopolymerizable layer on a suitable, transparent support. The support is such that its adhesive attraction to the exposed or polymerized areas of the matrix is greater than that of the master and conversely its adhesive attraction to the unpolymerized areas is less than that of the master. The lamination is then brought into contact with a transparent original, i.e., a photographic transparency, and exposed to actinic light. After the exposure, the original is removed and the master is stripped from the photopolymerizable layer. The underexposed photopolymer material adheres to the master forming the hydrophobic or printing image.

In the printing or reproduction operation, the imaged surface or master is first pretreated to improve its printing quality. This is accomplished by treating, e.g., swabbing or wiping, the lithographic surface with an "etch" solution. This solution does not etch in the usual sense thought of in the printing art, but the term is used for historical reasons. The solution or solutions do help maintain or improve the hydrophilic characteristics of the background and/or the hydrophobic and ink receptive characteristics of the image areas.

The etch solution usually used in the art contains water to wet out the background areas so that they will not be ink receptive, glycerol to retard evaporation of the water, ammonium phosphate/phosphoric acid and/or other materials known in the art which act upon the hydrophilic surface to make it smooth and water-receptive. The solutions may contain a water-soluble colloid such as gum arabic, other water soluble hydrophilic colloids, or other surface active agents to improve the hydrophilic/hydrophobic characteristics of the surface. However, if photopolymer imaging is used, another etch solution should be applied prior to the standard etch solution. This is a solution of 1–30% zirconium oxychloride, 1–40% glycerine, and the remainder being water; this solution improves the wetting properties of the lithographic surface.

The master is then secured in place on the master cylinder of a duplicating press and wet with the dampening solution, which may be water or can be a dilute solution of the etch solution, i.e., a conventional solution of glycerine, buffered phosphoric acid, and water. The master is inked by the ink roller, applying a greasy, lithographic printing ink to the areas not wet by the water, i.e., the ink is only applied to the water-repellent image material. In some duplicating presses, the dampening solution and ink are applied from the same roller.

The ink image on the master is printed on a rubber offset cylinder, which in turn prints the image on a receptor that passes between the offset cylinder and a pressure cylinder. The offset cylinder is used so that a right-reading copy is obtained from a right-reading master, see FIG. 2. However, a direct printing process can be employed when the imaged master is wrong-reading.

In the lithographic surfaces of the invention, the hydrophilic filler can be selected from many finely divided materials such as clay, chalk, talc, silica, silica gel, vanadium pentoxide, barium sulfate, magnesium trisilicate, and the like. Silica gel is a preferred filler as its use produced an imaged printing surface which had good "fresh" wearing properties. Some of the other fillers produced imaged surfaces which were satisfactory but did not wear as well when used without aging or heat being applied. With respect to the amount of filler, its particle size, and the uniformity of its particle size, if the master is to be imaged by photopolymer materials, these parameters should be such that the master is receptive to the imaging material, i.e., easy for the polymer image to penetrate or diffuse into the master surface. It was found that when the filler had very large particle sizes (e.g., 20 microns), thus very high porosity, the master was only receptive to the polymer image at the tops of the protruding particles thus giving fuzzy images. Also it was found that when the particle size was smaller and the ratio of the volume of the filler to that of the binder was low, i.e., the spaces between the filler particles completely or almost completely filled with binder, again fuzzy polymer images were obtained. The best results were obtained with fillers having a particle size of 3 to 9 microns. However, fillers having a particle size of 0.4 to 12 microns and weight ratios of filler to binder from 1.07 to 1 to 5.69 to 1 can be used in the lithographic surface of the invention.

The binder used in the preferred embodiment is the salt produced by the reaction of polyacrylic acid and polyethylenimine, i.e., polyethylenimine polyacrylate. However, other water-insoluble ion-crosslinked polymers, i.e., the salts of high molecular weight polybasic acids with a polyethylenimine can be used as the binder. The salts produced by the reaction must be dissolved in any solvent used.

Polyacrylic acid as the ammonia salt, ammonium polyacrylate, is the preferred polymeric acid but others such as polyacrylic acid, polychloroacrylic acid, polymethacrylic acid are useful where the equivalent weight is 150 or less. Also copolymers of acrylic, itaconic, maleic acids in which the equivalent weight is 150 or less, e.g., maleic acid/methyl vinyl ether copolymer, are also useful.

The polyethylenimines useful in the invention are those produced by the polymerization of ethylenimine and having the general structure:

$$-\left(CH_2-CH_2-\underset{R}{\underset{|}{N}}\right)_n-$$

where R is H or any organic radical of up to 2 carbon atoms, the polymer having a molecular weight of at least 5,000 and generally about 30,000 to 40,000.

To lower the viscosity of the composition for ease of coating and also maintain the solubility of the acid used, a suitable solvent such as ammonium hydroxide, other water soluble salts of ammonia, e.g., ammonium carbonate, can be used as long as the solvent is compatible with the filler, also further amounts of water, small amounts of alcohol, or surface active agents can also be added.

The invention will be further illustrated by, but is not intened to be limited to, the following examples.

*Example I*

A coating mixture was made of 143 g. of a 15% solution of polyacrylic acid as the ammonium salt, i.e., ammonium polyacrylate (this $NH_4$ salt of polyacrylic acid is obtainable from the B. F. Goodrich Company and prepared from 60 parts of 25% polyacrylic acid and 40 parts 26° Bé. ammonia, the polymer solution having a specific gravity of 1.10, and a viscosity of 1000–2000 c.p.s. as determined at 78° F. on a Brookfield viscosimeter, Model #LVF, at a spindle speed of 12 r.p.m. with a number 2 spindle); 50.5 g. of a 50% aqueous polyethylenimine (having a molecular weight of 30–40,000 and manufactured by Chemirad Corp.); 43.0 ml. of concentrated ammonium hydroxide and a solution of 7.5 g. of $Zn(OAc)_2 \cdot H_2O$ in 151.5 ml. of water. This gave a ratio of equivalents of imine to equivalents of acid of 1.42 to 1. To 103 g. of this ammoniacal solution was added 30 ml. of water and 70 g. of clay of average particle size 0.8 micron, ranging from 0.4 to 6.0 microns, and an oil absorption value of 37–41 (pounds of oil to "wet" 100 lbs. of clay) as determined by ASTM method D281–31, and the solution was then mixed in a ball mill.

After 16 hours in the mill, the dispersion had a viscosity on the order of 500 cps. and was coated on resin treated paper i.e., Fraser 52# Barrier coated paper, to a wet thickness of 0.002 inch. The coating was accomplished in a knife over roll coater. The coating was dried by passing through a drier, wherein the temperature was maintained at 110° C. The coating was heated at this temperature for 10 minutes. The coating was cut into sheets, and one sheet was imaged in a photothermographic office copy machine such as disclosed in assignee's U.S. patent application, Heiart et al., Ser. No. 234,616, filed Nov. 1, 1962. The machine was set to operate at a speed of 100 inches per minute and a thermal transfer temperature of 115°. The original material was a sheet of paper containing line and halftone images.

The photopolymerizable matrix used was prepared from a solution of 21.5 g. of cellulose acetate-butyrate and 14.5 g. of cellulose acetate in 66.0 g. of methyl Cellosolve and 254 g. of methylene chloride, 87.5 g. of pentaerythritol triacrylate, 2.63 g. of polyethylene oxide having an average molecular weight of 4000 (available from Union Carbide as "Carbowax 4000"), 47.5 g. of a solution of 12.0 g. of Pontacyl Wool Blue (C.I. 50,315) in 300 g. of methyl Cellosolve 55 g. of a solution containing 8.9% polyethylenimine of molecular weight about 35,000 and 12.0% acetic acid in ethylene glycol monomethyl ether, 1.05 g. of phenanthrenequinone and methylene chloride to make 945 g. The cellulose acetate, butyrate contained 20.5% acetyl groups, 26% butyryl groups, 2.5% hydroxyl groups and had a viscosity of 9.0–13.5 poises determined by ASTM method D1343–54T in a solution described as Formula A, ASTM method D871–54T. The cellulose acetate contained 39.4% acetyl groups and 55% combined acetic acid and had a viscosity of 130–182 poises determined by ASTM method D1343–56 in a solution described as Formula A, ASTM method D871–56.

The composition was coated on an 0.001 inch-thick polyethylene terephthalate film support to a dry coating thickness of 0.0006 inch. The coating was dried and overcoated with a 0.0001 inch (dry) layer of paraffin wax as set forth in Burg, Ser. No. 234,214, filed Oct. 30, 1962.

After leaving the photothermographic machine, the imaged surface of the master was swabbed with a solution of 10% zirconium oxychloride, 30% glycerine, and 60% water, and allowed to dry at room temperature for 24 hours.

The surface was then mounted on an offset press (A. B. Dick offset duplicating press) and swabbed with an "etch" solution generally known in the art. The surface was then used for printing over 1000 prints, the copies having very good image quality.

*Example II*

A coating composition was prepared from the following ingredients:

2100 g. of 15% polyethylenimine in water (molecular weight 30–40,000),
1350 g. of 15% solution of polyacrylic acid as the ammonium salt, i.e., ammonium polyacrylate (as described in Example I),
200 g. (220 ml.) of concentrated ammonium hydroxide,
672 g. of silica gel having an average particle size of 4$\mu$.

The dispersion was made by high-shear stirring, and was then adjusted to have a viscosity of about 500 cps. by addition of 200 ml. of a 50/50 solution of concentrated ammonium hydroxide and water. The ratio of equivalents of imine to acid was 2.61 to 1.0. To the dispersion, 1 ml. per gallon of sulfonated oleic acid (sodium salt) was added as a coating aid. The dispersion was then coated on a resin treated paper, 52 lb. barrier coated paper, and dried. The coating was calendered by rolling between a heated, polished, steel roll and a compressed, felt roll, the rolls produced a pressure of about 20 pounds per square inch.

The coating was then cut into sheets and imaged with line and halftone images as set forth in Example I. The only difference was that the photopolymerizable matrix used was prepared by mixing 16.8 g. of cellulose acetate-butyrate, 11.7 g. of cellulose acetate, 59.8 g. of pentaerythritoltriacrylate, 1.0 g. of phenanthrenequinone, 1.27 g. of Ponyacyl Wool Blue BL (C.I. 50,315), 0.75 g. of polyethylenimine (free base), 4.0 g. of a glyceryl ester wax, "Castorwax," and 4.67 g. of methoxypolyethylene glycol having an average molecular weight of 750 (available from Carbide and Carbon Corp. as "Carbowax 750"). The cellulose acetate-butyrate contained 20.5% acetyl groups, 26% butyryl groups, 2.5% hydroxyl groups and had a viscosity of 9.0–13.5 poises determined by ASTM method D1343–54T in a solution described as Formula A, ASTM method D871–54T. The cellulose acetate contained 39.4% acetyl groups and 55% combined acetic acid and had a viscosity of 130–182 poises determined by ASTM method D1343–56 in a solution described as Formula A, ASTM method D871–56. The composition was coated on an 0.0008 inch thick polypropylene film support to dry coating thickness of 0.0004 inch. The coating was dried and overcoated with a 0.0001 inch (dry) layer of paraffin wax as set forth in Burg Ser. No. 234,214, filed Oct. 30, 1962.

The imaged surface was swabbed with the two "etching" solutions as in Example I, the plate was mounted on an offset duplication press and it produced over 1000 excellent prints.

*Example III*

An ammoniacal solution of poly(methyl vinyl ether, co maleic acid) was made by neutralization with ammonia of a solution of the polymeric acid. The solution of the polymeric acid was made by dissolving and reacting 50.0 g. of a one-to-one copolymer of methyl vinyl ether and maleic anhydride with 200 g. of $H_2O$ at 95° C. for one hour. The copolymer (sold by the General Aniline and Film Corp. as "Gantrez" AN–119) had a specific gravity of 1.37; a 5% aqueous solution had a viscosity of 50 cps. After hydrolysis the polyacid had a calculated neutral equivalent of 87. When solution was complete, the mixture was cooled and 100 ml. of concentrated ammonium hydroxide was added. To 25 g. of this solution mixed with 10 ml. of concentrated ammonium hydroxide was added 35.0 g. of 15% polyethylenimine (as described in Example I) and 10.0 g. of silica gel of 4.0 microns average particle size. This mixture was stirred with a high shear stirrer and coated manually on 52 lb. barrier-coated paper using a wire-wound rod (28 mil diam. wire) to meter the coating. The coating was dried and used as in Example I as a receptor for transfer of a photopolymer image. The imaged master was used to print 1000 prints as described in Example I.

*Example IV*

A coating mixture was prepared as set forth in Example I and was coated on a 0.004 inch-thick polyethylene terephthalate film support which was subcoated with vinylidene chloride-methyl acrylate/itaconic acid copolymer as disclosed in Alles et al., U.S. 2,779,684. The coating was dried as described in Example I and cut into two sheets.

One sheet was imaged by writing on the surface of the dried coating with a hydrophobic pencil, Dixon Fax offset reproducing pencil. The other sheet was imaged by typing upon it with a hydrophobic ink ribbon, "Girl Friday" office machine all purpose black ribbon, made by Girl Friday, South Orange, N.J.

The imaged master sheets were then individually mounted on an offset press and swabbed with an "etch" solution. The masters produced good copies of the images made by the pencil and ink ribbon.

The photopolymerizable composition that is used to image the master, i.e., form the hydrophobic image areas, in the preferred embodiment is any one of the compositions disclosed in assignee's U.S. patents, Burg et al., 3,060,023, Heiart, 3,060,026, or disclosed in U.S. applications, Burg et al., Ser. No. 163,078, filed Dec. 29, 1961, and Ser. No. 156,538, filed Dec. 1, 1961.

One solid photopolymerizable composition that is useful comprises:

(a) A thermoplastic polymeric compound solid at 50° C., 3 to 97 parts by weight;

(b) An ethylenically unsaturated compound containing one or more terminal ethylenic groups, having a boiling point above 100° C. at normal atmosphere pressure, being capable of forming a high polymer by photoinitiated addition polymerization, 97 to 3 parts by weight;

(c) A free-radical generating addition polymerization initiator, activatable by radiation, 0.001 to 10.0 parts by weight; and in addition, if desired, (d) A thermal polymerization inhibitor, 0.001 to 6.0 parts by weight.

The various components are disclosed in assignee's U.S. patents, Plambeck 2,760,863; Plambeck, 2,964,410; Notley, 2,951,758; Barney et al., 3,096,127; Martin and Barney, 2,927,022 and others. The preferred monomeric compounds are difunctional, but monofunctional monomers can also be used. In addition, the polymerizable ethylenically unsaturated polymers of Burg U.S. Patent 3,043,805, Martin U.S. Patent 2,929,710 and similar materials may be used alone or mixed with other materials.

The lithographic surface of the invention has many uses in the printing and reproduction arts, one of the most important being its use as an offset master for office copy duplication or the like.

The printing surface of the invention is highly receptive to water in the nonimage areas and yet is capable of holding the ink-receptive photopolymerizable imaging material which has heretofore been extremely unreliable. The surface of the lithographic element is simple to image with a photopolymer and reproduces copies having excellent image quality, i.e., either line or halftone images. The surface also maintains the nonprinting background areas hydrophilic, and eliminates background stain.

The invention is particularly useful with images produced by the transfer of photopolymerizable materials since it results in long life of the polymer image. In addition to the improved results obtained with photopolymer images the lithographic surface can be imaged easily by other processes known in the art.

What is claimed is:

1. A lithographic printing master element comprising
(a) a water resistant support, and
(b) a water insoluble coating composition on said support having a hydrophilic filler having a particle size of about 0.4 to 12 microns and the salt produced by the reaction of a polyethylenimine of the formula $$\left(-CH_2-CH_2-\underset{R}{\underset{|}{N}}-\right)_n$$

having a molecular weight of at least 5,000 where R is hydrogen or any organic radical of up to 2 carbon atoms, and a polybasic acid selected from the group consisting of polymethacrylic acid, polyacrylic acid, polychloroacrylic acid, copolymers of said polymeric acids, and a copolymer of maleic acid where the equivalent weight of said polymeric acids and copolymers is no greater than 150 and the ratio of equivalents of said polyethylenimine to the equivalents of said acid is at least 1.3 to 1.0 and the ratio of said filler to said reaction product being from 1.07:1 to 5.69:1.

2. A lithographic printing master element as defined in claim 1 where said polybasic acid is polyacrylic acid.

3. A lithographic printing master element as defined in claim 1 where said polybasic acid is a copolymer of maleic acid.

4. A lithographic printing element comprising
(a) a water resistant support,
(b) a water insoluble coating composition on said support having a hydrophilic filler having a particle size of about 0.4 to 12 microns and the salt produced by the reaction of a polyethylenimine of the formula $$\left(-CH_2-CH_2-\underset{R}{\underset{|}{N}}-\right)_n$$

having a molecular weight of at least 5,000 where R is hydrogen or any organic radical of up to 2 carbon atoms, and a polybasic acid selected from the group consisting of polymethacrylic acid, polyacrylic acid, polychloroacrylic acid, copolymers of said polymeric acids, and a copolymer of maleic acid where the equivalent weight of said polymeric acids and copolymers is no greater than 150 and the ratio of equivalents of said polyethylenimine to the equivalents of said acid is at least 1.3 to 1.0 and the ratio of said filler to said reaction product being from 1.07:1 to 5.69:1, and
(c) a hydrophobic ink-receptive image attached to the surface of said coating composition.

5. A lithographic printing element as defined in claim 4 where said acid is polyacrylic acid.

6. A lithographic printing element as defined in claim 4 where said polybasic acid is a copolymer of maleic acid.

7. A lithographic printing element comprising
(a) a water resistant support,
(b) a water-insoluble coating composition on said support having a hydrophilic filler and the salt produced by the reaction of a polyethylenimine of the formula $$\left(-CH_2-CH_2-\underset{R}{\underset{|}{N}}-\right)_n$$

having a molecular weight of at least 5,000 where R is hydrogen or any organic radical of up to 2 carbon atoms, and a polybasic acid selected from the group consisting of polymethacrylic acid, polyacrylic acid, polychloroacrylic acid, copolymers of said polymeric acids, and a copolymer of maleic acid where the equivalent weight of said polymeric acids and copolymers is no greater than 150 and the ratio of equivalents of said polyethylenimine to the equivalents of said acid is at least 1.3 to 1.0, and
(c) a hydrophobic ink-receptive photopolymerized image attached to the surface of said coating composition, said filler having a particle size of 3 to 9 microns and the weight of said filler to said reaction product being about 1.07:1 to 5.69:1.

8. A process for preparing a lithographic printing element which comprises
(a) coating a water resistant support with a water-insoluble composition having a hydrophilic filler having a particle size of about 0.4 to 12 microns, a polyethylenimine of the formula $$\left(-CH_2-CH_2-\underset{R}{\underset{|}{N}}-\right)_n$$

having a molecular weight of at least 5,000 where R is hydrogen or any organic radical of up to 2 carbon atoms, and a polybasic acid selected from the group consisting of polymethacrylic acid, polyacrylic acid, polychloroacrylic acid, copolymers of said polymeric acids, and a copolymer of maleic acid where the equivalent weight of said polymeric acids and copolymers is no greater than 150 and the ratio of equivalents of said polyethylenimine to the equivalents of said acid is at least 1.3 to 1.0, and the ratio of said filler to said reaction product being from 1.07:1 to 5.69:1,
(b) drying said coating to evaporate said water and ammonia,
(c) transferring an image of photopolymer to the surface of said dried coating, and
(d) washing said image surface with an aqueous solution containing about 1–30% zirconium oxychloride.

No references cited.

WILLIAM B. PENN, *Primary Examiner.*

ROBERT E. PULFREY, *Examiner.*

J. A. BELL, *Assistant Examiner.*